March 11, 1930.  C. E. GATES  1,750,514
HITCH FOR MOWING MACHINES AND THE LIKE
Filed Aug. 11, 1927
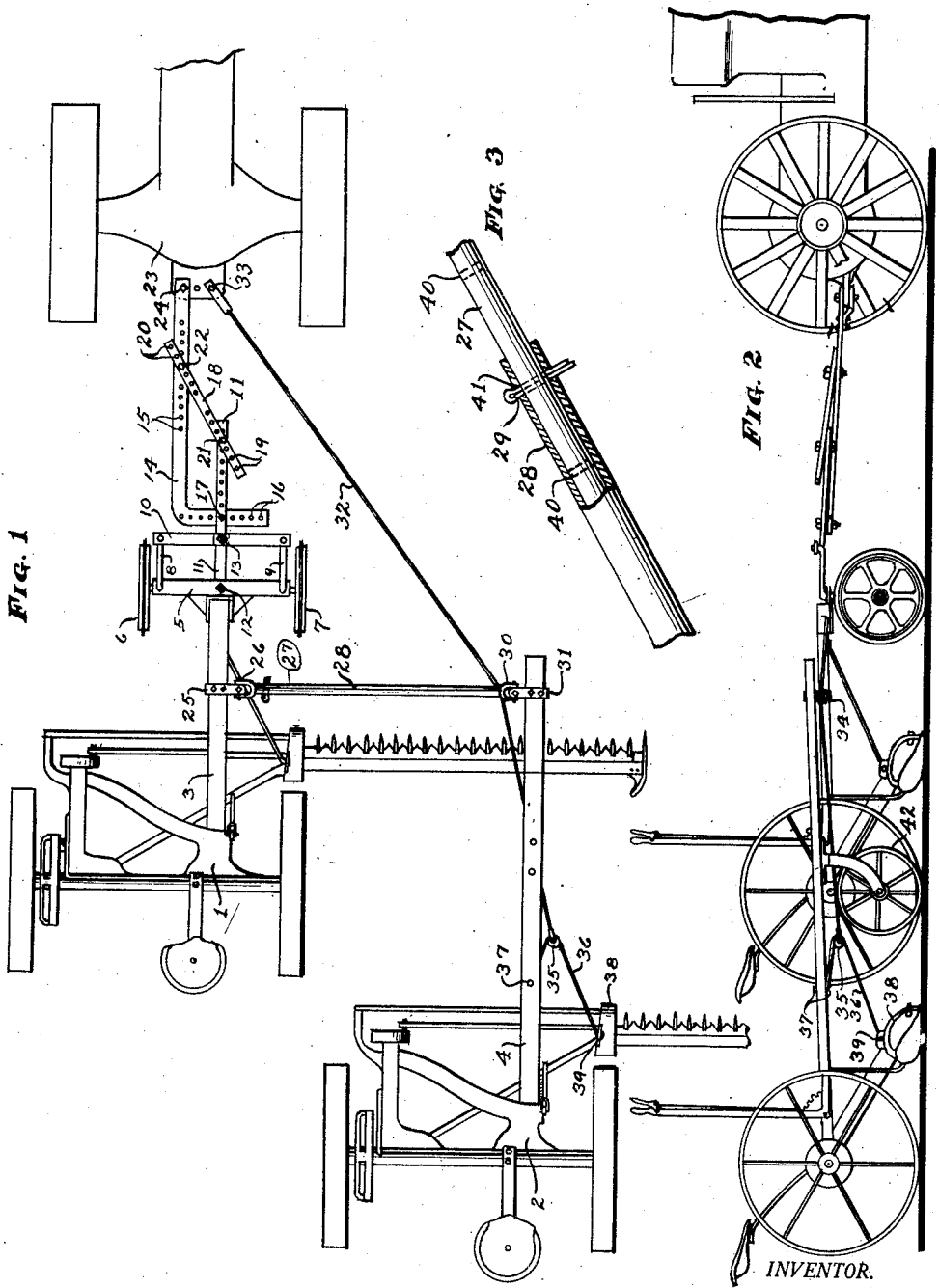
INVENTOR.
Charles E. Gates
BY
ATTORNEY.

Patented Mar. 11, 1930

1,750,514

UNITED STATES PATENT OFFICE

CHARLES E. GATES, OF SEDGWICK COUNTY, KANSAS

HITCH FOR MOWING MACHINES AND THE LIKE

Application filed August 11, 1927. Serial No. 212,284.

The invention relates to a hitch for a plurality of mowing machines as attached to a tractor so that the machines will follow each other around the field and cut the field clean as they go.

Referring to the drawings; Fig. 1 is a plan view of a pair of mowing machines as attached to the tractor by my invention. Fig. 2 is a side view of Fig. 1. Fig. 3 is an enlarged detail view of the separating bar.

In the drawings; 1 and 2 represent mowing machines having tongues 3 and 4. Tongue 3 is attached to a truck 5 having two wheels 6 and 7 which are mounted on spindles attached to crank arms 8 and 9. These crank arms are connected by a link 10. At 11 is a guiding member, having holes 11$^x$ pivotally attached as at 12 and 13. At 14 is an L-shaped member provided with adjusting holes 15 and 16 and it is bolted to the member 11 at 17. At 18 is shown a stabilizing member provided with adjusting holes 19 and 20. This member is bolted to the member 11 at 21 and to the member 14 at 22. The member 14 is attached to the tractor 23 by means of a bolt 24. At 25 is shown a yoke bolted to the tongue 3 supporting a universal joint 26 connecting between the yoke 25 and the rod 27 which telescopes into the pipe sleeve 28 and is stationed by a cotter pin 29 passing through holes in the pipe 28 and the rod 27. The outer end of the pipe 28 is provided with a universal joint 30 which connects to a yoke 31 which is rigidly attached to the tongue 4 of the mowing machine 2. At 32 is shown a cable attached to the tractor at 33, and running around the pulley 34 on the pipe 28 and connecting to a pulley 35 around which is looped a cable 36, one end of which is attached to a tongue 4 at 37; the opposite end is attached to the sickle support frame 38 at the point 39.

By the adjusting of the bolts 17 and 21 and 22, in the holes 16 and 11$^x$, 19 and 11$^x$, 15 and 20, the mowing machine 1 may be made to follow the tractor directly or to one side or the other of the tractor.

By removing the cotter pin 29, the rod 27 may be slipped in or out of the pipe 28, thereby spacing the tongues 3 and 4 any desired distance apart, so that the sickle bars of the two machines will over lap each other any desired distance. When the two machine tongues are properly spaced, the cotter pin may be replaced through the hole 41 and any selected hole 40 in the rod 27 thereby maintaining the desired adjustment. The tongue 4 is provided with a castor wheel 42 for the support of the tongue 4. Experience with this hitch has proven that the mowing machines will turn a corner as square as will the tractor and still mow all the field without skipping any patches. Owing to the easy adjustment of the spacing means, it is easy to hitch machines of varying length sickle bars together and still have a proper spacing of the related parts.

Such modifications may be employed as lie within the scope of the appended claim.

Having fully described my invention what I now claim as new and desire to secure by Letters Patent is:

In a device of the class described, an L-shaped draft bar, a guiding element adjustably attached to the base element of said bar and a diagonal brace adjustably connecting between the bar and the guiding element; a truck and a pair of wheels mounted on spindles supporting the truck; a crank arm for each spindle, a link hinged to the guide element and connecting to the spindles; a tongue of a machine carried by the truck; an adjustable brace member, a tongue of another machine, said brace member connecting and spacing said tongues; and a cable associated with said brace member and adapted to connect from the source of draft to the second machine.

In testimony whereof I affix my signature.

CHARLES E. GATES.